Figure 1:
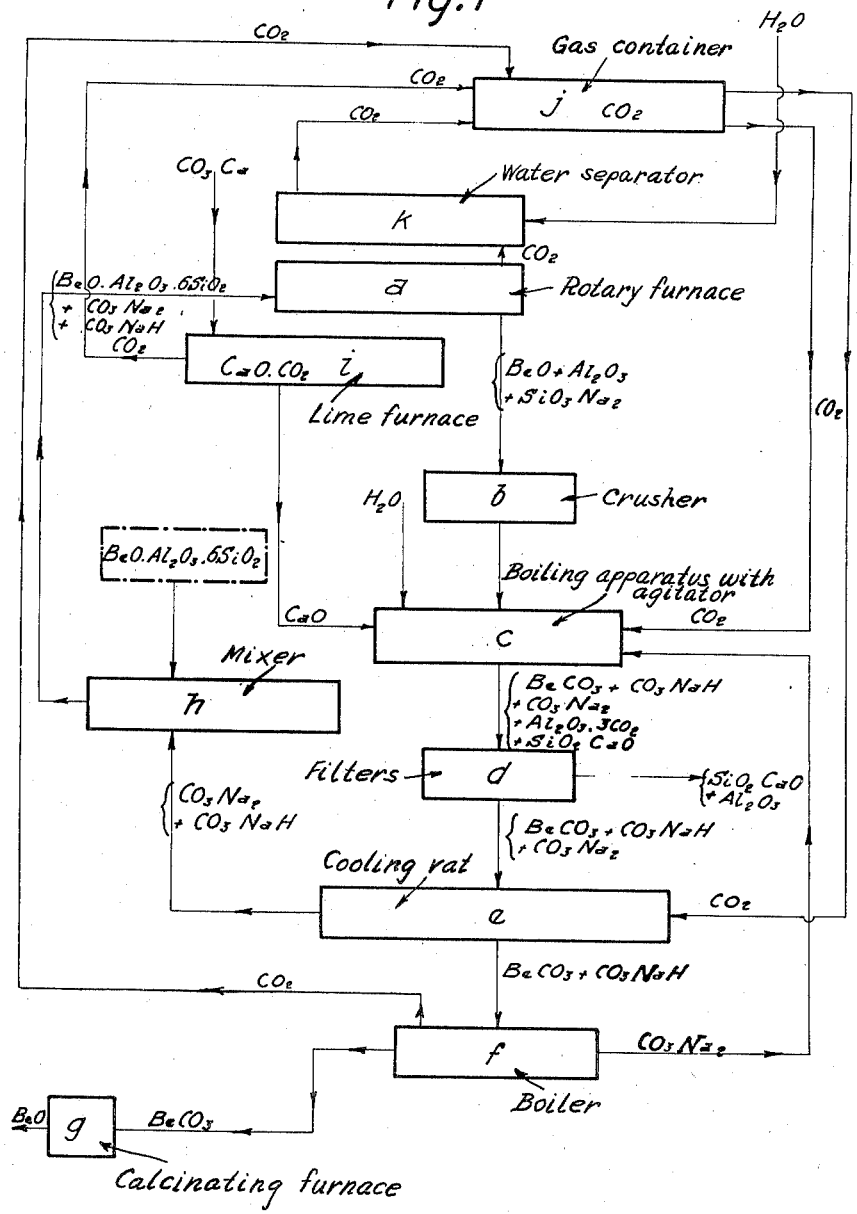

Patented Apr. 15, 1941

2,238,206

UNITED STATES PATENT OFFICE 2,238,206

PROCESS FOR OBTAINING SOLUBLE BERYLLIUM COMPOUNDS STARTING FROM ORES CONTAINING BERYLLIUM

Carlo Adamoli, Milan, Italy, assignor to Perosa Corporation, Wilmington, Del., a corporation of Delaware Application July 17, 1937, Serial No. 154,236
In Italy July 20, 1936

5 Claims. (Cl. 23—22)

The processes utilised for the extraction of beryllium contained in ores containing beryllium which are met with in general in nature in the form of ores with a basis of silicates, may be connected for the greater part with the ordinary processes of analytical disintegration of silicates.

Thus there have already been proposed various processes of extraction comprising in their most general aspect in the first place the fusion of the ore with an excess of carbonate such as calcium or sodium carbonate or other carbonate, or of anhydrous oxide or hydrate of an alkaline earth or alkali metal (for example caustic soda or potash in an anhydrous state) as well as in a second phase the decomposition of the reaction product containing beryllium by means of a strong acid for example hydrochloric acid or sulphuric acid.

The principal known processes of this kind in fact employ, after disintegration of the ore by fusion with alkalies, the decomposition of the fused mass by means of strong acids. From this result difficulties of the well known technical kind for example difficulties arising from the necessity of rendering insoluble large masses of gelatinous silica, and difficulties in separating beryllium from impurities such as iron and alumina.

Moreover the processes in question have never allowed working to be carried out under economical and industrial conditions by reason in particular of the considerable consumption of alkaline reagents required during the first phase of the operation (disintegration of the ore); these reagents are during the second phase neutralised by acids both being thus lost in the form of salts having no industrial value, for example in the form of NaCl, CaCl$_2$, Na$_2$SO$_4$, CaSO$_4$ or other salts of this kind.

The present invention has for its subject a process of treatment which permits the beryllium to be extracted starting from its ores (in general silicate ores such as beryl for example) in the form of soluble compounds (in general salts) and which allows at the same time the disadvantages mentioned above to be avoided and in particular the utilisation of acid agents to be avoided and all the difficulties which arise therefrom.

This process consists essentially in the first place in causing to act upon the ore containing beryllium, by roasting the ore at a high temperature with the reagent, an anhydrous oxide or hydrate or a carbonate or bicarbonate of an alkali or alkaline earth metal or mixtures thereof, continuing the reaction to the formation of the neutral silicate of the alkali or alkaline earth metal of the reagent introduced but without arriving at the fusion of the mass, and then in decomposing the reaction product by a wet method, preferably by boiling at ordinary pressure or if desired under pressure by means of a suitable base, or, if desired, salt, which reacts upon the silicate formed by displacing the silica of this latter and thus liberating from the mass the basic oxides contained therein, consequently permitting the beryllium to be separated from the mass by means of an alkaline or saline agent such for example as the acid carbonate of sodium, NaHCO$_3$, or ammonium carbonate, causing the beryllium to pass into the state of a soluble compound from which it may be then extracted directly in particular in the form of glucine BeO; the complete operation takes place under these conditions without requiring employment of acid agents.

According to one particularly advantageous method of carrying out the process there is utilised in the first phase for the attack of the ore a reagent (for example sodium carbonate and/or bicarbonate) which causes the silica of this ore to pass into the state of soluble silicate or silicoaluminate and then in the second phase there is caused to act upon this latter by lixiviation at the boiling point a decomposing agent (for example calcium oxide or hydrate) which has the effect of precipitating the silica in an insoluble form, for instance in the state of insoluble silicate.

When, for example, the treatment according to the invention is applied to beryl by subjecting it to roasting with sodium carbonate Na$_2$CO$_3$ and when the subsequent decomposition of the product of roasting is effected by boiling with calcium hydrate Ca(OH)$_2$ the complete operation of disaggregation of the ore and rendering the beryllium soluble takes place according to the reactions:

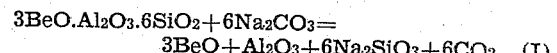
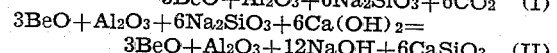
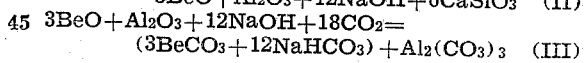

$3BeO.Al_2O_3.6SiO_2+6Na_2CO_3=$
$\qquad 3BeO+Al_2O_3+6Na_2SiO_3+6CO_2$ (I)
$3BeO+Al_2O_3+6Na_2SiO_3+6Ca(OH)_2=$
$\qquad 3BeO+Al_2O_3+12NaOH+6CaSiO_3$ (II)
$3BeO+Al_2O_3+12NaOH+18CO_2=$
$\qquad (3BeCO_3+12NaHCO_3)+Al_2(CO_3)_3$ (III)

The process which forms the subject of the present invention is advantageously carried out industrially according to a cycle of operations which may be illustrated by a diagram such as that shown on the accompanying drawings. This diagram relates to an example which is in no way a limiting one, in which the attack is produced on beryl by means of sodium carbonate Na$_2$CO$_3$ according to the Reaction I, then the lixiviation of the product of roasting by means of a solution of lime $Ca(OH)_2$ according to the Reaction II and then carbonation by means of $CO_2$ according to Reaction III. Obviously a similar diagram might equally well illustrate a cycle of operations which all being effected according to the invention would comprise utilisation of different starting materials and reactants of different natures.

In the example of Figure 1 of the annexed drawings $a$ represents a rotary furnace in which the mass is heated and roasted, $b$ a crusher, $c$ a boiling apparatus and $d$ a series of filters from whence the alkaline solution containing the beryllium comes by filtration. This alkaline solution containing the beryllium passes through a wooden cooling vat $e$ to precipitate the salts (carbonates) formed and reaches a boiler $f$ at the outlet of which the soluble compound (salt) of beryllium to be obtained is collected; $g$ is a furnace for calcination of this compound serving for the obtaining of glucine.

The cyclic installation comprises furthermore a mixer $h$, a lime furnace $i$, a gas container $j$ and a water separator $k$ for the washing of the gases ($CO_2$ principally) which leave the furnace $a$.

The apparatus thus constituted operates as follows for carrying out the cycle of operations to be effected, starting from the attack on the beryl by means of sodium carbonate $Na_2CO_3$.

In the rotary furnace $a$ the roasting of the beryl is effected with the $Na_2CO_3$ by heating to a temperature of 800–850° C. so as to produce disintegration of the ore into the state of a frit without, however, reaching fusion of the mass. In this way the silica $SiO_2$ is transformed into $Na_2SiO_3$ according to the Reaction I. On the other hand the furnace $a$ is connected at the outlet of the gases to the separator $k$ which acts as a washing and $CO_2$-regenerating device.

At its outlet from the furnace $a$ the roasted mass is crushed in the crusher $b$ and introduced into the boiling apparatus $c$ made of wood and provided with an agitator as well as a device for directly heating it with steam. To this boiling apparatus is fed a boiling solution of $Ca(OH)_2$ obtained from CaO coming from the lime furnace $i$. This solution of $Ca(OH)_2$ reacts upon the disintegrated mineral according to the Reaction II; the $Na_2SiO_3$ decomposes giving rise to $CaSiO_3$ in the granular state and the reaction liberates the basic oxides of the beryl BeO and $Al_2O_3$ at the same time as the alkalies are regenerated in the form of NaOH.

When the reaction is finished there is introduced at boiling the $CO_2$ coming from the gas holder $j$ so as to precipitate the excess of $Ca(OH)_2$ in the form of $CaCO_3$ and to effect carbonation according to the Reaction III to transform the BeO into $BeCO_3$, $Al_2O_3$ into $Al_2(CO_3)_3$ and NaOH into sodium carbonate $Na_2CO_3$. Then the temperature is caused to drop to 40–45° C. and a determined quantity of $CO_2$ is introduced from the gas holder so as to transform only a part of the $Na_2CO_3$ into $NaHCO_3$ until the obtaining of a concentration of 8–9% of this salt which dissolves the $BeCO_3$. Care must be taken that the quantity of $CO_2$ introduced in this phase is not in excess with respect to that which is necessary in order to prevent the separation of the sparingly soluble $NaHCO_3$.

After the solution of the beryllium salt the liquid constituted by the alkaline solution containing the beryllium is filtered and after the residue has been separated therefrom principally in the form of $CaSiO_3$ the filtered solution is introduced into the cooling vat $e$ comprising at the base an outlet aperture and is allowed to cool there down to the surrounding temperature. In these conditions about half the $Na_2CO_3$ deposits; at this moment the $CO_2$ from the gas holder is introduced into the vat, this gas producing the separation of a remaining part of the salt in the form of $NaHCO_3$. The liquid is poured off to separate it from the saline deposit and is introduced into the boiler $f$ where, by boiling, the basic beryllium carbonate $BeCO_3$ is precipitated and separated by pouring off the alkali liquid formed by the carbonate $Na_2CO_3$ and is then washed and dried in a hydro-extractor. Starting from the said beryllium basic carbonate, glucine BeO is directly obtained by calcination in the furnace $g$.

The saline deposit separated from the vat $e$ and composed of $Na_2CO_3$ and $NaHCO_3$ is discharged into the mixer $h$ where it is mixed with fresh beryl before being brought to the furnace $a$ and thus being returned into the cycle. The alkaline liquid in which the $BeCO_3$ has been precipitated in the boiler $f$ which liquid contains $Na_2CO_3$ returns in the cycle to the boiling apparatus $c$ where the lime is introduced in the form of calcium oxide CaO. This CaO comes from the lime furnace $i$ in which it is prepared by calcination of marble powder with a basis of calcium carbonate $CaCO_3$ which is thus decomposed giving $CO_2$ which is regenerated in the gas holder $j$ as shown in the drawing.

The yields obtained by the cycle of operations which the process comprises with respect to the beryllium present in the starting ore attain 95%.

The development of the cycle described above well shows the great simplicity of the process; the industrial apparatus is not costly for there is no need of special materials for the formation of the necessary apparatus and none of the liquids which take part in the phases of the alkaline process with $Na_2CO_3$ is corrosive. The $Na_2CO_3$ and $NaHCO_3$ circulate continuously in the cycle and the sole effective expense is that of the lime which is produced at little cost. The filtration of the mass after boiling in the boiling apparatus $c$ is very simple; due to the fact that the utilisation of acid agents is avoided the gelatinisation of the silica and the necessity of then rendering it insoluble is avoided. Moreover the residue obtained after filtration has a composition which allows, in so far as $CaCO_3$ and $SiO_2$ is concerned, it to be used for example in the manufacture of cement.

Figure 2:
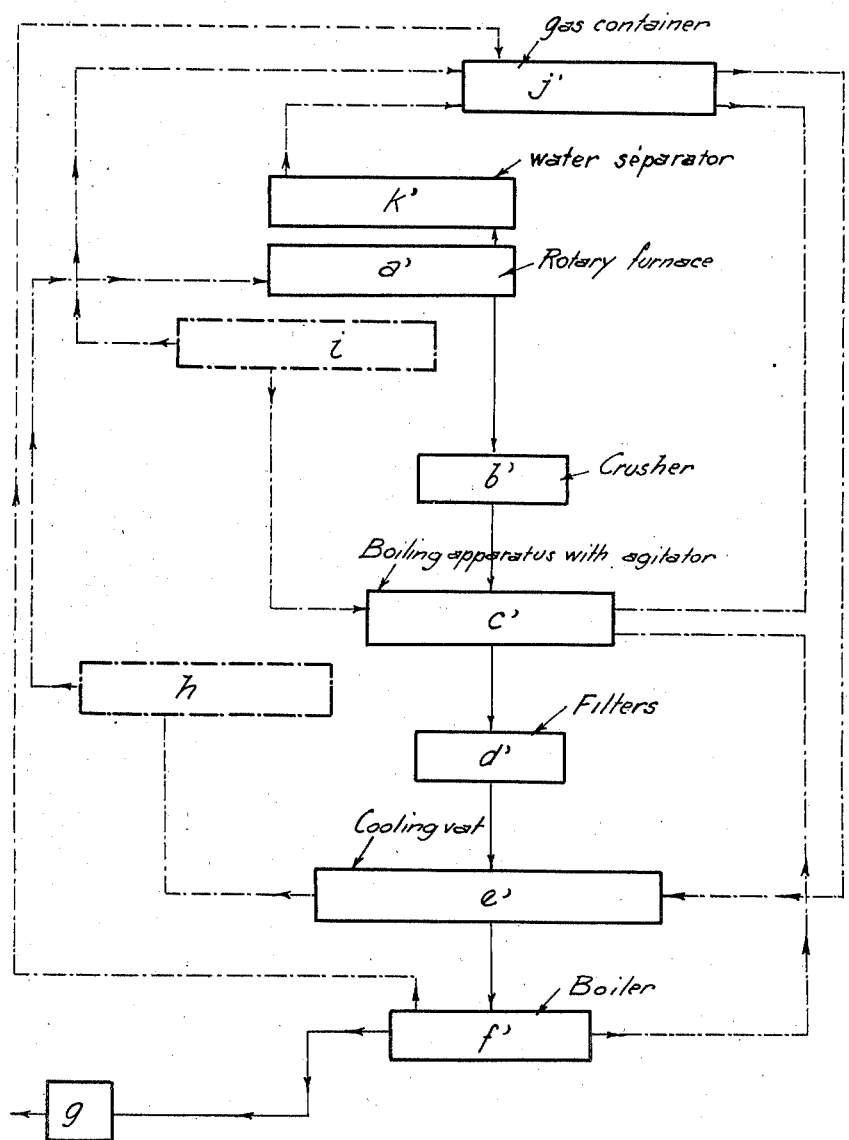

Fig. 2 illustrates a flow sheet of apparatus used in a modified form of my process.

With the same ideas as according to the process described above comprising the obtaining in the first phase of a soluble silicate and in the second phase the displacement of the silica in the form of an insoluble silicate one may likewise according to a modification of the process cause to act upon the ore by heating with the latter an alkali which gives an insoluble silicate for example calcium carbonate $CaCO_3$, and then produce the decomposition of the reaction product by boiling with a soluble hydrate for example NaOH. If, however, the operation is carried out in this way the heating temperature is higher than in the case described above, it may attain 1100–1200° C.

The decomposition of the product arising from the disintegration of the ore may also be effected in an autoclave under pressure. In this case according to a modified operation of the process described above the product of roasting disintegrated by the reaction corresponding to Reaction I is taken and the silicate formed is extracted with alumina by treating the said product in an autoclave under pressure by means of a dilute caustic soda solution for example as well as superheated steam under a pressure of 5-6 atmospheres; the sodium silicate $Na_2SiO_3$ formed and the greater part of the alumina then enter into solution.

When the operation is finished the beryllium may be separated in the form of a soluble compound by treatment by means of an alkali such as calcium hydrate at boiling, and carbonation, the silica and alumina being precipitated in the form of a silicate and an aluminate or of an insoluble silico aluminate. In particular, the beryllium oxide which has not been dissolved may be separated from the solution of silicate or silico aluminate obtained and the alkali recovered in the form of sodium carbonate by precipitation of the filtered solution by means of carbon dioxide.

In lieu of using lime, the operation may be carried out by direct carbonation which produces the precipitation of the silica and alumina and the solution of the beryllium oxide in the acid carbonate $NaHCO_3$ formed in the mass by introduction of carbon dioxide.

The invention is illustrated in the following non-limiting numerical example.

In this example 100 kgs. of beryl containing 12.5% of BeO was taken and mixed with 200 kgs. of $Na_2CO_3$ and $NaHCO_3$ coming from the cyclic operation previously effected and this mixture was subjected to heating to a temperature of 800-850° C. in a rotary furnace or muffle for 2-3 hours.

The operation was thus carried out with an excess of reagent with respect to the quantity theoretically necessary and this excess of reagent favoured the reaction in the sense that it reduced the temperature of disintegration of the ore and facilitated the operation. The heated product did not melt at the temperature of the reaction but reformed into frits; thus there was produced fritting without fusion.

After crushing, the heated mass leaving the furnace was introduced into the lixiviation or lye washing apparatus in which was a boiling solution of milk of lime containing 150 kgs. of CaO.

After boiling, filtration, and separation of the alkaline salts which returned into the cycle, the solution of sodium bicarbonate and beryllium carbonate was caused to boil until the precipitation took place of 30 kgs. of basic beryllium carbonate which by calcination provided 11.5 kgs. of BeO.

Obviously the indications given above for the method of effecting the process have no limiting character and the operative methods may be caused to vary at will as well as the nature and the succession of the operations effected without departing from the scope of the invention.

I claim:

1. A process for obtaining soluble compounds starting from beryllium silicate ores comprising the steps of roasting the ore with sodium carbonate, which binds the silica in form of a neutrol silicate at a temperature high enough to sinter but low enough to avoid fusion of the mass, treating at boiling temperature the reaction product with a solution of calcium hydrate, thereby displacing the silica in the form of an insoluble silicate, then introducing carbon dioxide, which causes the beryllium oxide to pass into the state of beryllium basic carbonate, separating said carbonate in solution from the other compounds formed, precipitating it and calcining it to obtain beryllium oxide.

2. A process for obtaining soluble compounds starting from beryllium silicate ores, comprising the steps of roasting the ore with sodium carbonate, which binds the silica in form of a neutral silicate at a temperature high enough to sinter but low enough to avoid fusion of the mass, lixiviating the roast at boiling temperature with a solution of lime, introducing carbon dioxide, thereby precipitating the silica and the alumina and solubilising the beryllium oxide in the sodium acid carbonate formed by the introduction of the said carbon dioxide, separating said carbonate in solution from the other compounds formed, precipitating it and calcining it to obtain beryllium oxide.

3. A process for obtaining soluble compounds starting from beryllium silicate ores, comprising the steps of roasting the ore with an attacking agent comprising at least one alkali metal compound of the class consisting of the anhydrous oxides, hydrates, carbonates and bicarbonates, at a temperature between 600 and 1200° C., treating the reaction product by the humid way and in the hot with an alkaline earth metal compound capable of displacing the silica in the form of an insoluble silica compound and then causing to act on the solution carbon dioxide, which first converts the beryllium oxide into beryllium carbonate and then causes the insoluble beryllium carbonate to pass into the state of a compound in solution, separating the said compound from the other compounds formed, precipitating it and calcining it to obtain beryllium oxide.

4. A process for obtaining soluble compounds starting from beryllium silicate ores and cyclic recovery of the reacting agent employed, which consists in roasting the ore with sodium carbonate at a temperature between 800 and 850° C., treating in the heated state the product by means of a solution of lime, then carbonating the beryllium oxide sufficiently to cause the formation of soluble beryllium carbonate, separating the beryllium carbonate obtained in solution from the other compounds, precipitating it and calcining it in the form of beryllium oxide, recovering the sodium carbonate, and using the carbon dioxide evolved in the roasting for the purpose of carbonation.

5. A process for obtaining soluble compounds starting from beryllium silicate ores, comprising the steps of roasting the ore with an attacking agent comprising at least one alkali-metal compound of the class consisting of the anhydrous oxides, hydrates, carbonates and bicarbonates, at a temperature high enough to sinter but low enough to avoid fusion of the mass, treating the reaction product by the humid way and in the hot with an alkaline earth metal compound which converts the soluble silicate into an insoluble silica compound, and then causing to act on the solution carbon dioxide which first converts the beryllium oxide into insoluble beryllium carbonate and then causes the beryllium carbonate to pass into the state of a compound in solution, separating the said compound from the other compounds formed, precipitating it and calcining it to obtain beryllium oxide.

CARLO ADAMOLI.